UNITED STATES PATENT OFFICE.

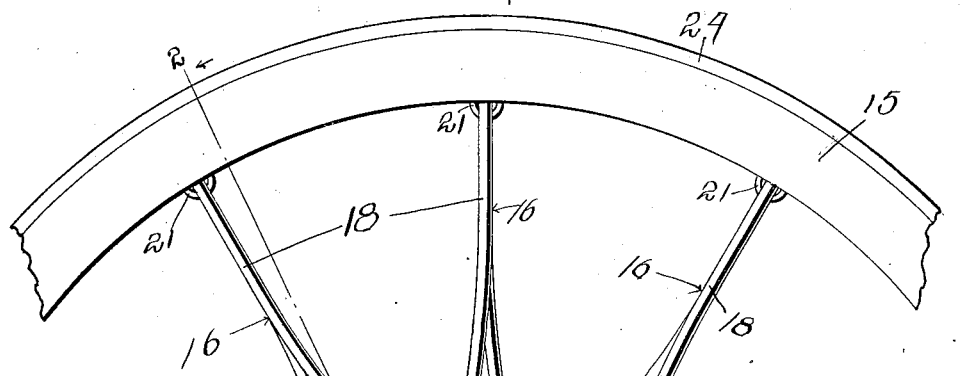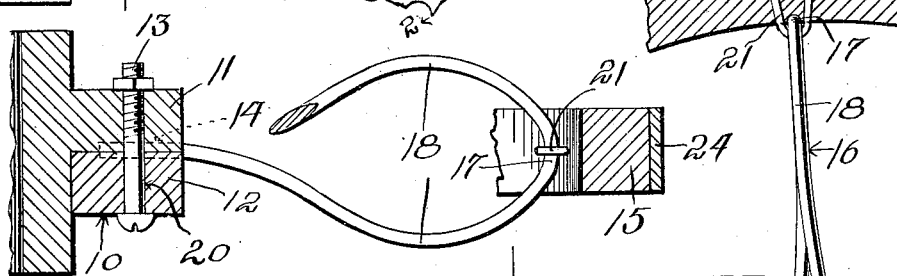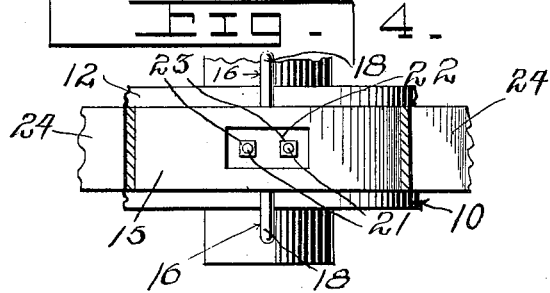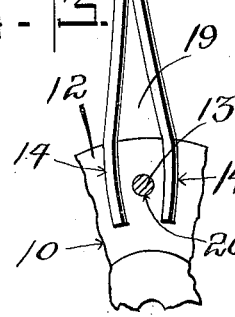

ROBERT A. NICHOLSON, OF RUSSELLVILLE, OKLAHOMA, ASSIGNOR OF ONE-HALF TO A. S. NELSON, OF OKLAHOMA, OKLAHOMA.

RESILIENT WHEEL.

1,087,391. Specification of Letters Patent. Patented Feb. 17, 1914.

Application filed February 19, 1913. Serial No. 749,518.

*To all whom it may concern:*

Be it known that I, ROBERT A. NICHOLSON, a citizen of the United States, residing at Russellville, in the county of Pittsburg, State of Oklahoma, have invented certain new and useful Improvements in Resilient Wheels; and I do hereby declare the following to be a full, clear, and exact description of the invention, such as will enable others skilled in the art to which it appertains to make and use the same.

This invention relates to new and useful improvements in vehicle wheels and more particularly to spring wheels of that type having spring spokes disposed between the rim and the hub, so as to take up shock and avoid friction to a greater or less degree, than is caused by ordinary pneumatic tires, the device being also designed to avoid punctures.

The essential object of the invention is the provision of a resilient or spring wheel with a novel form of spokes disposed between the hub and rim and connected thereto, the spokes being designed to give radially, transversely and longitudinally, whereby the liability to breakage is minimized and the wheel effectually cushioned, it being understood that the rim is adapted to carry an ordinary malleable iron or a rubber tire.

With the above and other objects in view, the invention resides more particularly in the peculiar combinations and arrangements of parts which will be partly illustrated as a preferred embodiment in the accompanying drawings and described in the specification, although the invention is protected for all desirable changes and uses within the scope of the invention as claimed.

In the drawings: Figure 1 is a side elevation of a fragmentary portion of a resilient or spring wheel constructed in accordance with the invention. Fig. 2 is an enlarged sectional view taken on the line 2—2 of Fig. 1. Fig. 3 is a longitudinal sectional view through a portion of the wheel with the hub parts in elevation. Fig. 4 is a top plan view of a portion of the wheel with a portion of the tire removed from the rim.

In illustrating the preferred embodiment of the invention, my improved resilient or spring wheel is shown as embodying a hub 10 consisting preferably of a pair of plates 11 and 12 held in clamped relation by means of a series of transverse fastening bolts 13 equi-distantly spaced apart around the same. The plate 11 is formed integral with the hub sleeve and the plate 12 is mounted on the latter as shown. The inner faces of the plates 11 and 12 are provided with coacting radial recesses 14, each being of semi-circular form so as to form substantially circular sockets when the plates are clamped together.

The rim of the wheel is designated by the numeral 15 and spokes 16 are interposed with relation to or disposed between said rim and the hub. These springs are formed substantially oval in shape, being constructed of single sections of resilient metal of circular cross section, preferably spring steel wire rebent to provide bight portions 17 and oppositely and outwardly bowed portions 18 projecting beyond the sides of the rim and hub. The extremities of the sections forming the spokes are brought together with respect to a line radiating from the meeting faces of the plates forming the hub but spaced apart circumferentially as shown at 19. The portions of the spokes thus brought together form relatively neck-like portions or stems which are engaged within the coacting recesses of the hub plates, the extremities of each spoke being engaged on each side of each bolt, there being recesses on each side of the bolt openings 20 for this purpose. The bight portions 17 of the spokes are connected to the rim by U-bolts 21, their threaded ends being disposed in recesses 22 in the peripheral face of the rim and engaged by taps or nuts 23 to secure the spokes in position transversely of the rim, as well as to permit the same to be readily removed if desired.

A tire 24 of any suitable material such as solid rubber or malleable iron or other cushion material, may be mounted on the rim to form a tread for the wheel. Attention is also called to the fact that the extremities of the spokes which are connected between the hub plates are oppositely twisted or torsioned alternately with respect to their disposition around the wheel, thus overcoming any tendency to create a twisting or torsioning action in one direction, one spoke compensating for the action of the other as will be readily apparent. It will thus be seen that the oppositely bowed portions of the spokes will produce a cushioning action laterally while the stem portions of the spoke will permit spring action radially and transversely, the latter operation being assisted by the oppositely bowed formation of the spokes, so as to effectually take up shock and vibration with a minimum amount of friction.

I claim:—

1. A spring wheel embodying a hub, a rim and a plurality of spring spoke members interposed therebetween, said members comprising each a single length of wire bent in substantially U-shaped form and having its bight portion secured transversely to the rims, the arms adjacent the bight portion being outwardly bowed and the inner portions of the arms being bent laterally to lie in the plane of the wheel and having their extremities bent inwardly to lie in radial alinement.

2. A spring wheel embodying a pair of hub plates having bolt openings therethrough and co-acting socket forming recesses on either side of the bolt openings, bolts engaged through the openings to clamp the plates together, a rim, spokes interposed with relation to the rim and hub, each spoke consisting of a single section of spring steel of circular cross section rebent to provide bight portions and having oppositely bowed portions, the extremities of the spokes being brought together in radial alinement and engaged in the sockets in spaced relation, U-bolts clamping the bight portions of the spokes to the rim, the rim having peripheral recesses and nuts on the bolts mounted in said recesses.

In testimony whereof, I affix my signature, in the presence of two witnesses.

ROBERT A. NICHOLSON.

Witnesses:
W. W. SMITH,
D. J. SMITH.

---

Copies of this patent may be obtained for five cents each, by addressing the "Commissioner of Patents, Washington, D. C."